Figure 1:
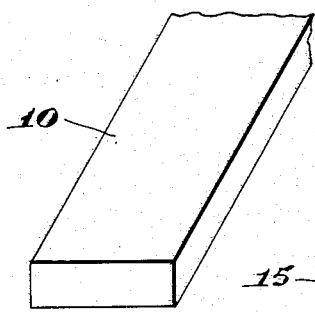

June 19, 1956  W. C. VIZARD  2,750,686
BEADED SHOE WELTING
Filed Aug. 12, 1953

INVENTOR.
William C. Vizard
BY J. Stanley Churchill
ATTORNEY

United States Patent Office 2,750,686
Patented June 19, 1956

2,750,686

BEADED SHOE WELTING

William C. Vizard, Brockton, Mass., assignor to Barbour Welting Company, Brockton, Mass.

Application August 12, 1953, Serial No. 373,818

3 Claims. (Cl. 36—78)

This invention relates to welting for a shoe, and more especially to the production of beaded welting of the type which is provided with a bead extending along its top face between its side edges adapted to lie closely against the shoe upper when incorporated in a shoe.

The present welting is an improvement upon the welting forming the subject matter of my United States Letters Patent No. 2,251,178, dated July 29, 1941.

The primary object of the invention is to produce an improved form of beaded welting of the type described wherein provision is made for supporting the bead forming elements in such a manner as to prevent the bead from inclining inwardly at an angle with respect to the surface of the welt extension of the welting greater than 90°, and preferably the bead forming elements are supported in such a manner as to incline the bead slightly toward the welt edge.

A further object of the invention is to provide a novel welting of the character described which may be economically manufactured from a strip of welting stock of minimum width.

A further object of the invention is to provide a novel and improved beaded welting which may be produced from a grain leather fillet in an economical and practical manner.

With these general objects in view and such others as may hereinafter appear, the invention consists in the novel beaded welting hereinafter described and particularly defined in the claims at the end of this specification.

Figure 6:
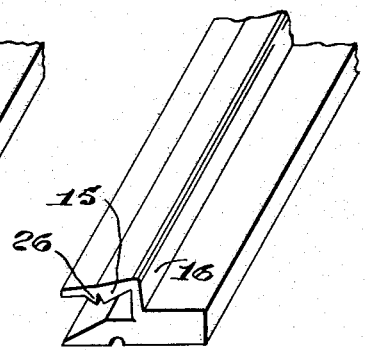
Figure 7:
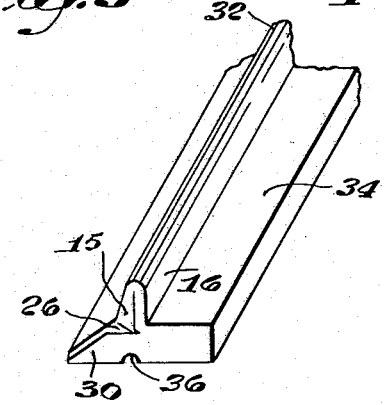

In the drawings, Figs. 1–5 are perspectives illustrating successive steps in the cutting of a strip of welt stock preparatory to the formation of the bead and the finished welt;

Fig. 6 is a perspective illustrating the first step in the folding of the strip of welt stock which has been cut in accordance with the disclosures of Figs. 1–5 preparatory to the formation of the bead and the disposition of the wedge-shaped supporting member under the core of the bead; and Fig. 7 is a perspective illustrating the completed beaded welt.

In general the present beaded welting is provided with an inseam flange along one marginal edge portion, a welt extension along the second marginal edge portion and a flap integral with the welt extension and having a portion thereof folded into bead forming relation. The bead is formed by a core member within the bead forming portion of the flap and preferably by a core member formed integrally therewith, and provision is made for supporting the core member by a wedge-shaped supporting member, also preferably formed integrally with the flap, and arranged to be tucked under the inseam side of the core member to maintain the bead in the desired position with relation to the welt extension and preferably so that the bead is maintained in a position of substantially 90° with respect to the surface of the welt extension or slightly less. The flap also includes a cover portion which forms the top lamina of the inseam flange in the finished article. The wedge-shaped supporting member may be integral with this portion of the flap.

Figure 2:
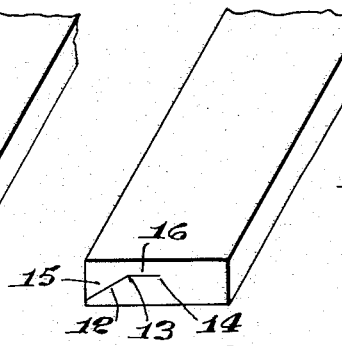
Figure 3:
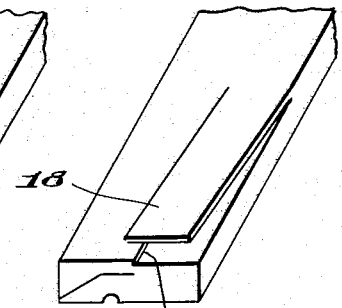
Figure 4:
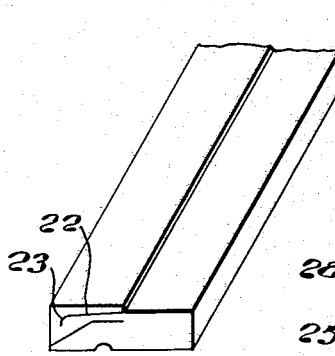
Figure 5:
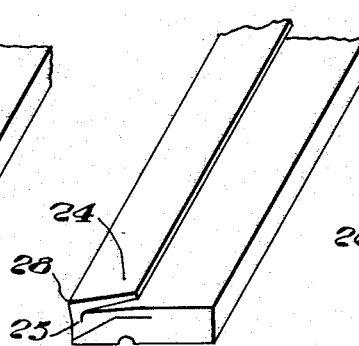

Referring to the drawings, 10 represents a strip of welting stock from which the present welt may be made which preferably comprises a fillet of leather $17/32''$ wide and $5/32''$ thick, with the upper surface of the fillet comprising the grain surface. In accordance with the preferred method of making the present beaded welt, an incision 12, as shown in Fig. 2, is made commencing at near the bottom of the inner side edge of the fillet and extending upwardly to a point 13 and then horizontally to a point 14, about midway between the two side edges of the fillet. This cut forms a core forming member 15 and the face web portion 16 of the bead forming portion of the flap. Preferably, the web portion 16 is of the thickness of about .055". The next step in the operation comprises the removal of a ribbon 18, about $1/15''$ in thickness from the uncut portion of the welt stock, as shown in Fig. 3. The removal of the ribbon 18 forms a shoulder 20, and starting at the shoulder an incision is made along the line 22 ending in a downward curl 23 that extends into the flesh fibers of the leather, thus providing a strong and free hinge at such point. The next step in the operation of forming the beaded welt comprises the lifting up of the cover portion 24 formed by the incision 22, and as this portion of the flap is lifted up the flap hinges at the curled end of the incision at the point 25 and the parts are folded into the position shown in Fig. 6 wherein one face of the bead is formed by the web portion 16 and the core 15 depends from the web portion 16, and a separate wedge-shaped core supporting member 26 is formed by the corner portion 28 of the welting stock in the condition shown in Fig. 5. As a result when the flap, which includes the web portion 16, core 15, core-supporting member 26, and cover portion 24, is folded from the position shown in Fig. 6 to that shown in Fig. 7, the core 15 is supported by the wedge-shaped core supporting member 26, the latter being tucked under the upwardly inclined underside of the core member 15 in the manner shown in Fig. 7. The cover portion 24 of the flap is cemented upon the tapered portion of the inseam flange indicated at 30, such portion of the inseam flange being formed by the first cut along the line 12 shown in Fig. 2. The cover portion 24 of the flap carrying the wedge-shaped core-supporting member 26 forms the top lamina of the inseam flange of the finished article. It will be understood that the contacting surfaces of the components of the flap will have been coated with suitable cement and pressed into the final position shown in Fig. 7 during the usual molding operation.

The bead indicated generally at 32 in Fig. 7 will be prevented from tipping inwardly toward the inseam flange by the wedge-shaped core supporting member 26, and in practice it is preferred to arrange the wedge-shaped member with respect to the core 15 so that the bead is maintained at an angle of 90° or slightly less with respect to the surface of the welt extension 34.

The undersurface of the welt may and preferably will be provided with the usual stitching groove 36 from which the inseam stitches may extend through the inseam flange during the usual inseaming of the welt into the shoe.

While it is preferred that the core forming member 15 and wedge supporting member 26 be formed integrally with the bead forming flap, nevertheless it is not desired to limit the invention in this respect.

From the description thus far it will be observed that the present construction of beaded welt may be produced using a minimum of stock and in a practical, economical manner, and the maintenance of the bead in predetermined angular relation with respect to the welt edge contributes to the utility of the beaded welt in the manufacture of a shoe. While it is preferred to construct the welt from a grain fillet of leather, nevertheless it is not desired to limit the invention in this respect, as other materials may be used if found advantageous.

Having thus described the invention, what is claimed is:

1. A beaded shoe welt having an inseam flange along one marginal edge, a welt extension along the second marginal edge, and a flap integral with the welt extension and having a portion providing a bead upstanding from the surface of the welt extension, said flap having a core member and a wedge-shaped core supporting member, both being integral parts of the flap, said wedge-shaped core supporting member being tucked under the inseam side of the core for disposing the bead at an angle not exceeding 90° with respect to the surface of the welt extension.

2. A beaded shoe welt having an inseam flange along one marginal edge, a welt extension along the second marginal edge, a bead upstanding from the surface of the welt extension said bead comprising a core member, and a wedge-shaped core-supporting member integral with said core member, said wedge-shaped core supporting member being tucked under the inseam side of the core member to maintain the bead upstanding from the surface of the welt extension at an angle not exceeding 90° with respect to the welt extension.

3. A beaded welt as defined in claim 2 wherein said inseam flange is laminated and the top lamina is integral with the core-supporting member.

References Cited in the file of this patent
UNITED STATES PATENTS

| | | |
|---|---|---|
| 1,828,728 | Arnold et al. | Oct. 27, 1931 |
| 2,153,321 | Vizard | Apr. 4, 1939 |
| 2,299,263 | Vizard | Oct. 20, 1942 |